(12) United States Patent
Schaefer

(10) Patent No.: US 8,952,898 B1
(45) Date of Patent: Feb. 10, 2015

(54) METHOD AND SYSTEM FOR DISPLAYING A QUICKTIP

(75) Inventor: Ronald Anthony Schaefer, Oceanside, CA (US)

(73) Assignee: Intuit Inc., Mountain View, CA (US)

( * ) Notice: Subject to any disclaimer, the term of this patent is extended or adjusted under 35 U.S.C. 154(b) by 2167 days.

(21) Appl. No.: 11/368,093

(22) Filed: Mar. 2, 2006

(51) Int. Cl.
*G09G 5/08* (2006.01)

(52) U.S. Cl.
USPC ............ 345/173; 345/156; 345/157; 345/179

(58) Field of Classification Search
USPC .................................. 345/173, 156–157, 179
See application file for complete search history.

(56) References Cited

U.S. PATENT DOCUMENTS

| | | | |
|---|---|---|---|
| 5,877,758 A * | 3/1999 | Seybold | 715/866 |
| 7,395,230 B2 * | 7/2008 | Hermreck et al. | 705/31 |
| 2002/0052792 A1 * | 5/2002 | Johnson et al. | 705/19 |
| 2002/0113810 A1 * | 8/2002 | Radtke et al. | 345/710 |
| 2003/0007014 A1 * | 1/2003 | Suppan et al. | 345/853 |
| 2003/0036912 A1 * | 2/2003 | Sobotta et al. | 705/1 |
| 2006/0111990 A1 * | 5/2006 | Cohen et al. | 705/32 |
| 2006/0155618 A1 * | 7/2006 | Wyle | 705/31 |

* cited by examiner

*Primary Examiner* — William Boddie
*Assistant Examiner* — Leonid Shapiro
(74) *Attorney, Agent, or Firm* — Osha Liang LLP

(57) ABSTRACT

A method for displaying a quicktip that includes obtaining a pointer position, determining a field closest to the pointer position, determining the quicktip for the field, and displaying the quicktip, wherein the quicktip that includes a precept for data associated with the field.

10 Claims, 7 Drawing Sheets

Roth IRA Contributions

Regular Roth IRA Contributions

| | | Taxpayer | Spouse |
|---|---|---|---|
| 18 | Enter regular Roth IRA contributions made for 2005, including any made between 1/1/2006 and 4/17/2006, any amounts later recharacterized to a traditional IRA, and any excess contributions, but not including any rollovers or conversions. Also include any contributions to deemed Roth IRAs under an employer plan ............ | | |
| 19 | Contributions recharacterized from a traditional IRA (from ln 4) .... | | |

*Since you're 50, you can enter up to $5,000*

— User Interface 300
— 324
— 320

FIGURE 3C

Roth IRA Contributions

| Regular Roth IRA Contributions | | Taxpayer | Spouse |
|---|---|---|---|
| 18 | Enter regular Roth IRA contributions made for 2005, including any made between 1/1/2006 and 4/17/2006, any amounts later recharacterized to a traditional IRA, and any excess contributions, but not including any rollovers or conversions. Also include any contributions to deemed Roth IRA's under an employer plan. | | Since you're under 50, you can enter up to $4,000 |
| 19 | Contributions recharacterized from a traditional IRA, (from ln 4) | | |

User Interface 300

Roth IRA Contributions

Regular Roth IRA Contributions

| | Taxpayer | Spouse |
|---|---|---|
| 18 | Enter regular Roth IRA contributions made for 2005, including any made between 1/1/2006 and 4/17/2006; any amounts later recharacterized to a traditional IRA, and any excess contributions, but not including any rollovers or conversions. Also include any contributions to deemed Roth IRAs under an employer plan | |
| 19 | Contributions recharacterized from a traditional IRA (from ln 4) | |

Since you do not have earned income, you do not qualify for a Roth.

FIGURE 3E

METHOD AND SYSTEM FOR DISPLAYING A QUICKTIP

BACKGROUND

Every year millions of people, companies, and other institutions file various documents with the different governing bodies, such as agencies and services of local, state and national governments. The documents typically are directed toward such things as filing taxes, inventory and accounting filings, medical reimbursement filings, and the like. Each document typically has multiple data-containing fields into which a user is required to enter data.

Each field in the document is typically completed with data representing a concatenation of various pieces of information. For example, in an accounting sheet, the data representing the amount of sales may include several pieces of information (e.g., the amount of sales completed (payment received and product shipped), the amount of sales ordered (payment received and product not yet shipped), amount of sales received under contract (payment not received and product not yet shipped)).

The parameters that define which pieces of information to include in the data are typically governed by one or more regulations. For example, a regulation may specify that sale received under a contract without payment received or product shipped may not be included on the accounting sheet.

While the documents are being filed with the different governing bodies, the different governing bodies constantly pass new regulations concerning the data entered in the documents. Specifically, the parameters for entering the data may change. For example, a person who marries in the tax year may or may not file a joint tax return with the person's spouse. As another example, recently a regulation is passed to allow a taxpayer to claim state and local tax deduction for sales or income tax. Tax for motor vehicles may be added to the deduction, but only at a general sales tax rate. In order to comply with the regulations passed by all of the governing bodies, the person entering the data must be aware of new regulations.

To file the various documents and ensure that the data entered into the documents comply with the regulations, software products that are directed toward filing the document may be used by people, companies, and institutions. Typically, software products include several methods for simplifying inputting the data into the documents. For example, a software product may separate the documents into forms, request data using user-friendly questions, and perform automatic calculations of different fields within the forms. By using an easy-to-use user interface, a person is able to navigate the complex documents and ensure compliance with regulations.

SUMMARY

In general, in one aspect, the invention relates to a method for displaying a quicktip that includes obtaining a pointer position, determining a field closest to the pointer position, determining the quicktip for the field, and displaying the quicktip, wherein the quicktip that includes a precept for data associated with the field.

In general, in one aspect, the invention relates to a data structure for maintaining a quicktip that includes a first element that includes a quicktip, and a second element that includes a field associated with a form, wherein the quicktip that includes a precept for data associated with the field.

In general, in one aspect, the invention relates to a computer program product that includes computer readable program code embodied therein for causing a computer system to obtain a pointer position, determine a field closest to the pointer position, determine the quicktip for the field, and display the quicktip, wherein the quicktip that includes a precept for data associated with the field.

In general, in one aspect, the invention relates to a computer system for displaying a quicktip that includes a quicktip repository for storing the quicktip, and a processor within the computer system for executing software instructions to perform obtaining a pointer position, determining a field closest to the pointer position, determining the quicktip for the field, and displaying the quicktip, wherein the quicktip that includes a precept for data associated with the field.

Other aspects of the invention will be apparent from the following description and the appended claims.

BRIEF DESCRIPTION OF DRAWINGS

FIGS. 3A-3E show examples of a user interface for displaying a quicktip in accordance with one or more embodiments of the invention.

DETAILED DESCRIPTION

Figure 1:
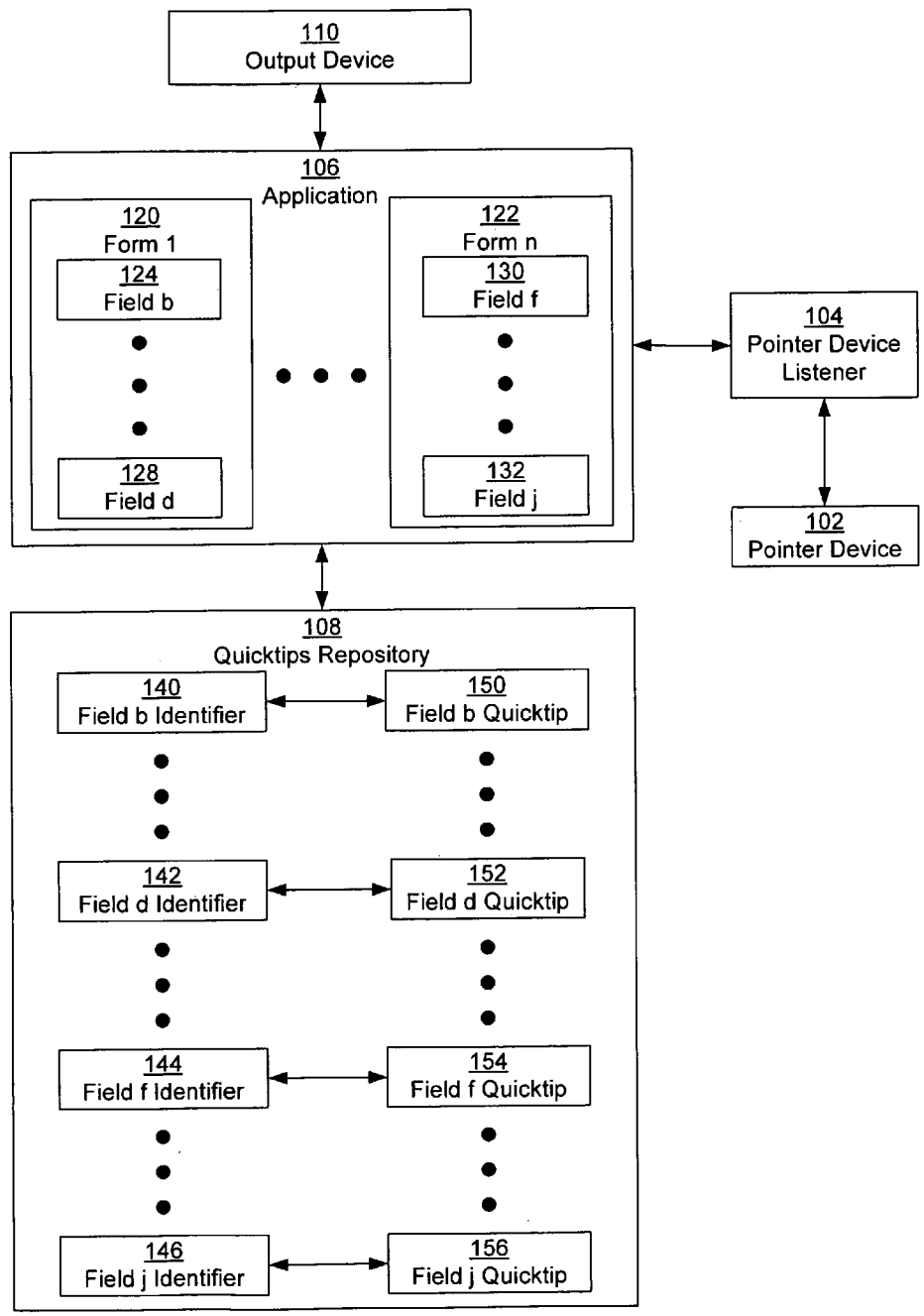
FIG. 1 shows a flow diagram of a system for displaying a quicktip in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to simplify keeping track of the precepts (i.e., instructions, rules, regulations, orders, that specify a general rule of action) governing the documents. Specifically, embodiments of the invention provide a mechanism for displaying a quicktip for data specific to a field. The quicktip instructs the user on the current precepts in accordance with one or more embodiments of the invention. Further, embodiments of the invention involves tracking a pointer and displaying only the quicktip that relates to the field closest to the pointer.

FIG. 1 shows a flow diagram of a system for displaying a quicktip in accordance with one or more embodiments of the invention. As shown in FIG. 1, the system includes a pointer device (102), a pointer device listener (104), an application (106), a quicktips repository (108), and an output device (100). Each of these components is described below.

The pointer device (102) corresponds to any type of device in which a user can enter data, such as a mouse, stylus, touch screen, keyboard, or any other data entering device. In one or more embodiments of the invention, the pointer device (102)

includes functionality to receive user input and translate the user input into pointer input corresponding to computer readable signals.

In one or more embodiments of the invention, the pointer device (102) is connected to a pointer device listener (104). The pointer device listener (104) typically corresponds to a program that includes functionality to determine from the pointer input the position of a pointer (i.e., virtual indicator on an output device) with respect to the output device (110) (described below) from the pointer input. In one or more embodiments of the invention, the output of the pointer device listener (104) is an x-axis value and a y-axis value that uniquely identifies the pointer position with respect to the output device (110). The pointer device listener (102) may be a part of operating system on which the application (106) is running, a part of the application (106), or only loosely connected to the application (106).

The application (106) corresponds to any type of computer application that assists a user in entering data into documents. The user may be associated with a single person, family, company, or other group. The document may be associated with virtually any governing body, such as agencies and services of local, state and national governments, health care organization, or any other group. The document is directed toward such things as filing taxes (e.g., W-2, 1040, etc.), inventory and accounting filings, medical reimbursement filings, and the like. Accordingly, the application (106) includes functionality to assist a user in entering data into the document.

The application (106) includes one or more forms (e.g., form 1 (120), form n (122)). Generally, a single form (e.g., form 1 (120), form n (122)) corresponds to a request of interrelated data. Multiple forms (e.g., form 1 (120), form n (122)) may exist in the application (106) to divide the requests for simplification purposes or separate the different options associated with the document.

In one or more embodiment of the invention, a form (e.g., form 1 (120), form n (122)) corresponds to an orderly arrangement of text (not shown) and fields (e.g., field b (124), field d (128), field f (130), field j (132)), such as a questionnaire, a document that may be entered, or any other such arrangement. In one or more embodiments of the invention, data may only be entered in the fields (e.g., field b (124), field d (128), field f (130), field j (132)).

The fields (e.g., field b (124), field d (128), field f (130), field j (132)) may be user-generated or calculated. A user-generated field corresponds to a field in which data within the field must be entered by a user. A calculated field corresponds to a field in which the data is generated by the application (106). Specifically, the application (106) includes functionality to perform calculations involving one or more user-generated fields (and calculated fields) in order to obtain the data and enter the data into the calculated field.

A field (e.g., field b (124), field d (128), field f (130), field j (132)) is governed by one or more precept. A precept is a rule, regulation, or instruction that specifies what data may be entered into a field. In one or more embodiments of the invention, the precept is created by the governing body of the document. For example, the precept may specify that the user must meet a certain qualification to enter a specific amount into the field (such as the user must be single). The precept may also specify the relationship between fields. For example, the precept may state that if data is entered into one field, then the data must also be entered into another field or another form.

Continuing with FIG. 1, the application (106) is connected to a quicktips repository (108). The quicktips repository (108) corresponds to a storage unit (e.g., flat file, hierarchical, or relational database, spreadsheet, or any other such repository) for quicktips. The quicktip repository (108) includes field identifiers (e.g., field b identifier (140), field d identifier (142), field f identifier (144), field j identifier (146)) and field quicktips (field b quicktip (150), field d quicktip (152), field f quicktip (154), field j quicktip (156)).

A field identifier (e.g., field b identifier (140), field d identifier (142), field f identifier (144), field j identifier (146)) uniquely identifies a field (e.g., field b (124), field d (128), field f (130), field j (132)). The field identifier may correspond to a line number and form name of a field (e.g., field b (124), field d (128), field f (130), field j (132)), to a unique number of the field, or to any other type of unique identifier of the field. The field identifier (e.g., field b identifier (140), field d identifier (142), field f identifier (144), field j identifier (146)) includes functionality to relate the field with the field quicktip.

Alternatively, rather than using a field identifier (e.g., field b identifier (140), field d identifier (142), field f identifier (144), field j identifier (146)), the field (e.g., field b (124), field d (128), field f (130), field j (132)) may contain a direct or indirect reference to the field quicktip (field b quicktip (150), field d quicktip (152), field f quicktip (154), field j quicktip (156)). The reference may correspond to a memory reference or any other such reference to the field quicktip (field b quicktip (150), field d quicktip (152), field f quicktip (154), field j quicktip (156)).

A field quicktip (field b quicktip (150), field d quicktip (152), field f quicktip (154), field j quicktip (156)) corresponds to a tip (e.g., textual, visual or auditory) that is intended to assist a user in entering the data. Specifically, the quicktip may include a precept for the field and/or the document. Further, the quicktip may be static or dynamic. A static quicktip is entered by a programmer or other such administrator and does not change during execution of the application (106). A dynamic quicktip relates data previously entered by the user to a precept. For example, if a user enters "married" in a field, the dynamic quicktip for a different field may be "must be single, do not enter data". As another example, the dynamic quicktip may state a value that a user has previously entered in a field. For example, if on line 9 of document A, a user enter the value $4,500, a dynamic quicktip for a different field may include the statement "Use value from line 9 of document A that is $4,500."

Continuing with FIG. 1, an output device (110) is also connected to the application (106). The output device (110) include functionality to display a quicktip. In one or more embodiments of the invention, the quicktip is displayed as a bubble, such as a in the shape of a cloud, pop-up box, circle, or any other such shape. In one or more embodiments of the invention, the output device (110) corresponds to a screen, such as a computer screen, personal digital assistant screen, cell phone screen, a screen associated with an embedded device, or any other such display device. Alternatively, the output device (110) may be a speaker or other such unit that includes functionality to generate an auditory signal representing the quicktip to the user. Regardless whether the output device (110) corresponds to a screen, speaker, or any other device type, the quicktip may be displayed using the output device (110).

Figure 2:
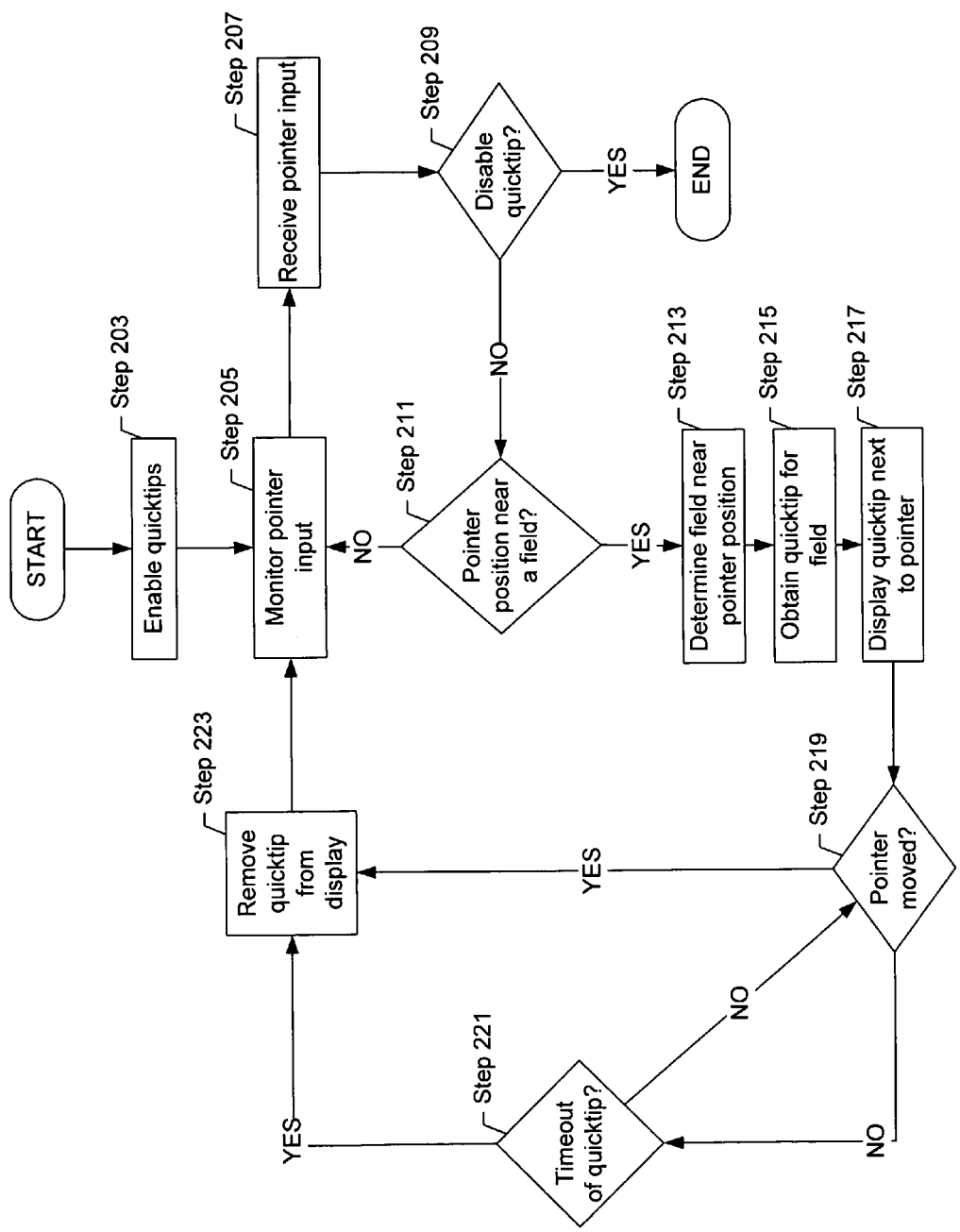
FIG. 2 shows flowchart of a method for displaying a quicktip in accordance with one or more embodiments of the invention.

FIG. 2 shows flowchart of a method for displaying a quicktip in accordance with one or more embodiments of the invention. Initially, the quicktips is enabled (Step 203). Enabling quicktips may be performed automatically when the application is launched, by clicking on an option in a menu, using a shortcut key, or performing any other technique known in the art.

After quicktips is enabled, then pointer input is monitored (Step 205). The pointer device may be polled by a pointer device listener or a pointer device listener may wait for a signal or interrupt from the pointer device. While monitoring the pointer input, pointer input is received (Step 207). The pointer input typically consists of information regarding the amount of movement of the pointer device or the new position of the pointer with respect to the output device. Accordingly, the pointer device listener is able to determine the exact position of the pointer.

Once pointer input is received and the pointer position obtained, a determination is made whether the quicktips is disabled (Step 209). The pointer input may specify that quicktips should no longer be displayed because the option in a menu is disabled, the application ends execution, or any other disabling input is received from the pointer. Accordingly, quicktips ends.

Alternatively, if the pointer input is not to disable quicktips, then a determination is made whether the pointer position is near a field (Step 211). Specifically, the pointer may be within a certain threshold of distance to a field or on a field. For example, a programmer or administrator may specify that the quicktips will trigger when the pointer is within 0.2 centimeters from a field.

If the pointer position is not near a field, then the pointer input is monitored again (Step 205). Alternatively, if the pointer position is near a field, then the field near the pointer position is determined (Step 213). In one or more embodiments of the invention, determining the field near the pointer position may include determining the position of fields around the pointer by the fields x and y coordinates and determining the distance to the pointer position (also designated by the x and y coordinates). The field closest to the pointer is used for the quicktip.

Accordingly, the quicktip for the field is obtained (Step 215). Obtaining the quicktip for the field may involve a query on the quicktip repository. Alternatively, the quicktip may be associated directly with the field as a parameter of the field. In such scenario, the parameters of the field are queried for the quicktip.

Once the quicktip is obtained, then the quicktip is displayed next to the pointer (Step 217). Displaying the quicktip may be performed by updating the output device only at the portion of the output device where the quicktip is to be displayed.

After displaying the quicktip, a determination is made whether the pointer moved (Step 219). If the pointer moved, then in one or more embodiments of the invention, the quicktip is removed from the display (Step 223).

Alternatively, if the pointer has not moved, then a determination is made whether the quicktips timed out (Step 221) in accordance with one or more embodiments of the invention. Specifically, a counter may be associated with the quicktip so that the quicktip is only displayed for a certain amount of time. If the quicktip timeout is reached, then the quicktip is removed from the display (Step 223). If the quicktip timeout has not been reached, then a determination is made whether the pointer moved.

Those skilled in the art will appreciate that rather than removing the quicktip based on the pointer position and/or a timeout, other parameters may also be used. Specifically, the removal of the quicktip is optional.

After removing the quicktip, then the pointer input is monitored (Step 205) and the method repeats until the quicktips are no longer enabled.

Figures 3A, 3B:
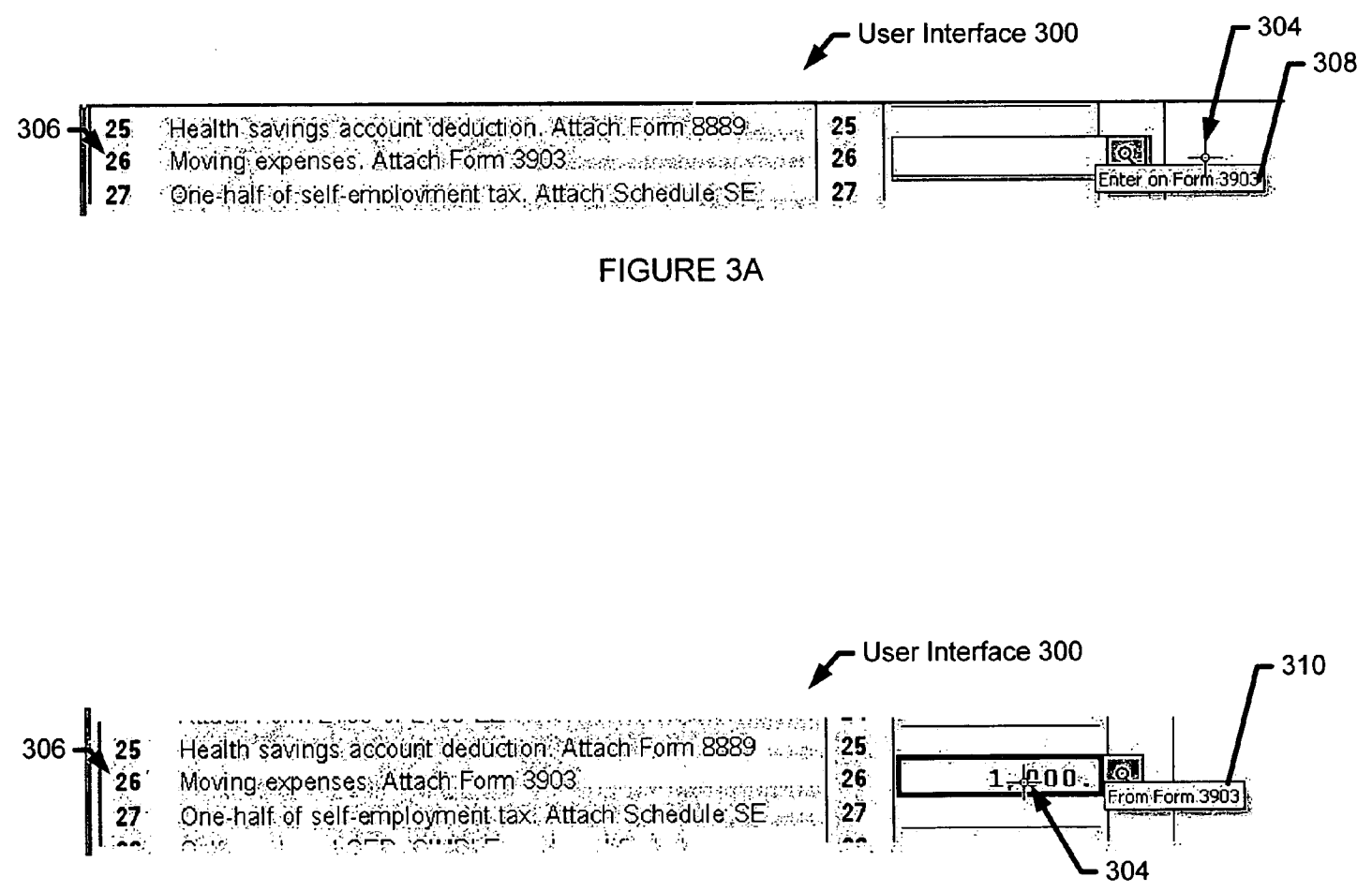

FIGS. 3A-3E show examples of a user interface for displaying a quicktip in accordance with one or more embodiments of the invention. In the following examples, consider the case in which a tax preparation application including various tax forms is used to prepare and file one or more tax returns. Accordingly, the fields in the various forms of the tax documents are related to taxes. FIGS. 3A and 3B show an example user interface (300) before and after a user inputs text into a field in accordance with one or more embodiments of the invention. As shown in FIG. 3A, before enter text into the line 26 (306) of the form, the user may place a pointer (304) near the text. A quicktip (308) informs the user that the field should have the value from Form 3903. Accordingly, the user enters the value.

FIG. 3B shows an example user interface (300) when the user places a pointer (304) near line 26 (306) after entering text in the field. As shown in FIG. 3B, the quicktip (310) changes from "Enter on Form 3903" to "From Form 3903." As shown in FIGS. 3A and 3B, by having a quicktip, the user is easily able to determine which data should be entered into a field. Further, when the field changes states, the quicktip is dynamic and reflects the change.

Quicktips may also be dynamic and change based on the user's profile in accordance with one or more embodiments of the invention. FIGS. 3C-3E show an example user interface (300) that displays a quicktip based on the user's profile in accordance with one or more embodiments of the invention. Specifically, as shown in FIGS. 3C-3E, the quicktip for line 18 (320) changes based on knowledge about a user's profile (i.e., age and income status).

For FIG. 3C, consider the scenario in which a user is 50 years old. The user may have entered the information in a previous field or the information may have been requested by the application during the initialization phase. In such a scenario, an example quicktip (324) informs the user "Since you're 50, you can enter up to $5,000." Thus, the user that is 50 years old knows that the maximum Roth IRA contribution for a 50 year old is $5,000.

However, consider the scenario in which the user is less than 50. FIG. 3D shows an example user interface (300) when the user is less than fifty years old. In such a scenario, an example quicktip (328) informs the user "Since you're less than 50, you can enter up to $4,000." Thus, the user that is less than 50 year old knows that the maximum Roth IRA contribution for people under 50 years old is $4,000.

Finally, consider the scenario in which a user is unemployed. FIG. 3E shows an example user interface (300) when the user has no income. In such a scenario, an example quicktip (328) informs the user "Since you do not have income, you do not qualify for a Roth." Thus, the user that has no income knows that only people with income can have a Roth IRA.

As shown in the above examples, quicktips allow users to easily determine the precepts governing the different fields. Further, because the quicktips are dynamic, the users are able to understand not only how fields are affected once data is entered, but also how a specific precept affects the user.

Figure 4:
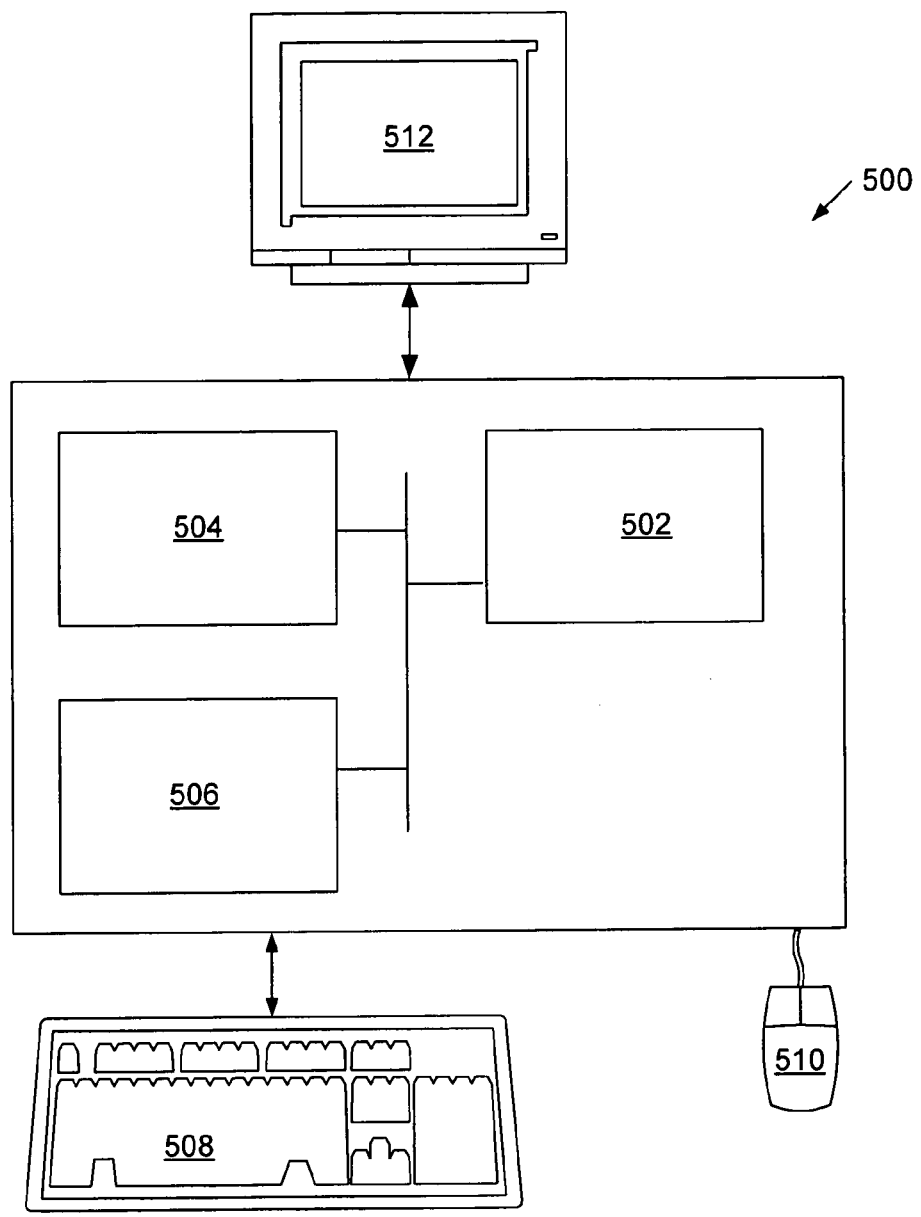
FIG. 4 shows a computer system in accordance with one embodiment of the invention.

The invention may be implemented on virtually any type of computer regardless of the platform being used. For example, as shown in FIG. 4, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512).

The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., application, quicktips repository, pointer listener, and other such components) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention clarify the precepts that are specific to different fields. Specifically, by associating a particular precept in a quicktip and having the precept in a field, embodiments of the invention provide a mechanism whereby a user can understand how to enter data into fields. Further, by simplifying the precept into a natural sentence, a sometimes difficult precept to understand, such as a government regulation for a tax document, is understandable to the average user.

In addition, embodiments of the invention display only the quicktip that is particular to a user. Specifically, because the quicktips are dynamic, a user can quickly access the precept that is directly relevant to the user and field.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for displaying a plurality of dynamic quicktip bubbles for a plurality of users, wherein each of the plurality of dynamic quicktip bubbles is displayed within a tax form of a computer system, the method comprising:
    obtaining a first pointer position on the tax form used by a first user of the plurality of users;
    determining a governed field on the tax form closest to the first pointer position, wherein the governed field requires content constrained by a government rule, wherein the government rule is created by a tax authority;
    generating, using a computer processor, a first dynamic quicktip bubble of the plurality of dynamic quicktip bubbles for the governed field, wherein generating the first dynamic quicktip bubble comprises:
        gathering first user entered data from a previously-entered field,
            wherein the first user entered data represents a first tax profile of the first user,
            wherein the first tax profile of the first user dictates a first content of the governed field, and
            wherein the governed field and the previously-entered field are distinct fields;
        creating a first tip for the governed field by applying the government rule to the first tax profile of the first user,
            wherein the first tip provides first advice as to the first content of the governed field based on the first tax profile, and
        placing the first tip within the first dynamic quicktip bubble;
    displaying the first dynamic quicktip bubble showing the first tip; and
    generating for a second user of the plurality of users a second dynamic quicktip bubble of the plurality of quicktip bubbles for the governed field,
        wherein the second dynamic quicktip bubble comprises a second tip providing second advice as to a second content for the governed field based on a second tax profile,
        wherein the second tip is created by applying the government rule to the second tax profile,
        wherein the second tax profile comprises second user entered data, entered by the second user into the previously-entered field, and
    wherein the first advice provided in the first tip is different from the second advice provided in the second tip.

2. The method of claim 1, wherein the first dynamic quicktip bubble is displayed in proximity to the governed field.

3. The method of claim 1, wherein the governed field is determined by a proximity of a second pointer position, used by the second user, relative to other fields on the tax form.

4. The method of claim 3, wherein the first pointer position and the second pointer position are different.

5. The method of claim 1, wherein the first dynamic quicktip bubble is displayed for a predetermined amount of time.

6. The method of claim 1, further comprising:
    receiving from the first user the first content directly in the governed field, wherein the first content received directly from the first user is based on the first advice provided in the first tip; and
    receiving from the second user the second content directly in the governed field, wherein the second content received directly from the second user is based on the second advice provided in the second tip.

7. A computer readable medium for storing a data structure for maintaining a plurality of dynamic quicktip bubbles for a plurality of users, the computer readable medium comprising:
    a first element comprising a governed field associated with a tax form, wherein the governed field requires content constrained by a government rule, wherein the government rule is created by a tax authority;
    a second element comprising a previously-entered field; and
    a third element comprising the plurality of dynamic quicktip bubbles for the governed field,
        wherein a first dynamic quicktip bubble of the plurality of quicktip bubbles is generated for a first user of the plurality of users by:
            gathering first user entered data from the previously-entered field,
                wherein the first user entered data represents a first tax profile of the first user,
                wherein the first tax profile dictates the first content of the governed field, and
                wherein the governed field and the previously-entered field are distinct fields;
            creating a first tip for the governed field by applying the government rule to the first tax profile of the first user, wherein the first tip provides first advice as to the first content of the governed field based on the first tax profile; and placing the first tip within the first dynamic quicktip bubble,
wherein the first dynamic quicktip bubble is displayed showing the first tip,
wherein a second dynamic quicktip bubble of the plurality of quicktip bubbles is generated for the governed field for a second user of the plurality of users,
wherein the second dynamic quicktip bubble comprises a second tip providing second advice as to a second content for the governed field based on a second tax profile,
wherein the second tip is created by applying the government rule to the second tax profile,
wherein the second tax profile comprises second user entered data, entered by the second user into the previously-entered field, and
wherein the first advice provided in the first tip is different from the second advice provided in the second tin.

8. The non-transitory computer readable medium of claim 7, wherein the first dynamic quicktip bubble is displayed in proximity to the governed field.

9. A non-transitory computer program product comprising computer readable program code embodied therein for causing a computer system to:
obtain a first pointer position on a tax form used by a first user of a plurality of users;
determine a governed field on the tax form closest to the first pointer position, wherein the governed field requires content constrained by a government rule, wherein the government rule is created by a tax authority;
generate a first dynamic quicktip bubble of a plurality of dynamic quicktip bubbles for the governed field, wherein generating the first dynamic quicktip bubble comprises:
gathering first user entered data from a previously-entered field,
wherein the first user entered data represents a first tax profile of the first user,
wherein the first tax profile dictates a first content of the governed field, and
wherein the governed field and the previously-entered field are distinct fields,
creating a first tip for the governed field by applying the government rule to the first tax profile of the first user, wherein the first tip provides first advice as to the first content of the governed field based on the first tax profile, and
placing the first tip within the first dynamic quicktip bubble; and
display the first dynamic quicktip bubble showing the first tip; and
generate for a second user of the plurality of users a second dynamic quicktip bubble of the plurality of quicktip bubbles for the governed field,
wherein the second dynamic quicktip bubble comprises a second tip providing secibd advice as to a second content for the governed field based on a second tax profile,
wherein the second tip is created by applying the government rule to the second tax profile,
wherein the second tax profile comprises second user entered data, entered by the second user into the previously-entered field, and
wherein the first advice provided in the first tip is different from the second advice provided in the second tip.

10. A computer system for displaying a plurality of dynamic quicktip bubbles comprising:
a quicktip repository for storing the plurality of dynamic quicktip bubbles; and
a processor within the computer system for executing software instructions to perform:
obtaining a first pointer position on a tax form;
determining a governed field on the tax form closest to the first pointer position, wherein the governed field requires content constrained by a government rule, wherein the government rule is created by a tax authority;
generating a first dynamic quicktip bubble of the plurality of dynamic quicktip bubbles for the governed field, wherein generating the first dynamic quicktip bubble comprises:
gathering first user entered data from a previously-entered field,
wherein the first user entered data represents a first tax profile of the first user,
wherein the first tax profile of the first user dictates a first content of the governed field, and
wherein the governed field and the previously-entered field are distinct fields,
creating a first tip for the governed field by applying the government rule to the first tax profile of the first user, wherein the first tip provides first advice as to the first content of the governed field based on the first tax profile, and
placing the first tip within the first dynamic quicktip bubble; and
generating for a second user of the plurality of users a second dynamic quicktip bubble of the plurality of quicktip bubbles for the governed field,
wherein the second dynamic quicktip bubble comprises a second tip providing second advice as to a second content for the governed field based on a second tax profile,
wherein the second tip is created by applying the government rule to the second tax profile,
wherein the second tax profile comprises second user entered data, entered by the second user into the previously-entered field, and
wherein the first advice provided in the first tip is different from the second advice provided in the second tip; and
an output device for displaying the first dynamic quicktip bubble showing the first tip and the second dynamic quicktip bubble showing the second tip.

* * * * *